Dec. 6, 1966  W. E. DUTOT  3,289,717
ROTARY EDGING TOOL WITH GUIDE WHEEL
Filed July 13, 1964

INVENTOR
Wilbur E. Dutot
BY William R. Piper
ATTORNEY

United States Patent Office 3,289,717
Patented Dec. 6, 1966

3,289,717
ROTARY EDGING TOOL WITH GUIDE WHEEL
Wilbur E. Dutot, 4021 Edgemoor Place, Oakland, Calif.
Filed July 13, 1964, Ser. No. 382,227
2 Claims. (Cl. 144—134)

The present invention relates to improvements in a rotary edging tool with guide wheel, and it consists in the combination, construction and arrangement of parts as hereinafter described and claimed.

When a sheet of plastic material such as Formica is to be applied to a supporting base for covering it, a layer of a self-hardening cement is applied to one face of the plastic sheet and also to one face of the base. The two cement layers are then allowed to stand until they feel dry to the touch at which time the plastic sheet is aligned with the base and then moved into contact with the base. The two layers of cement are thus brought into contact with each other and an instant bonding of the plastic sheet to the base takes place. It is now necessary to file the edge of the plastic sheet that projects a slight distance beyond the adjacent edge of the base. The Formica sheet is tough and it takes considerable time and strength as well as skill to file the Formica edge down so that it is flush with the base edge and still without making any file marks on the base edge.

A rotary file or edging tool can be mounted in the chuck of an electric motor and then the rotating tool can be applied to the overhanging edge of the Formica sheet in order to trim this edge and make it coincide with the edge of the base. The edging tool rotates at a high speed and it is almost impossible to trim the overhanging edge of the Formica sheet so that it will lie flush with the adjacent edge of the base without the tool also contacting with the base edge and marring it.

The principal object of my invention is to provide a ball bearing guide wheel that is slightly larger in diameter than the diameter of the rotary edging tool and is mounted on a shaft that is integral with the tool, the axis of said shaft coinciding with the axis of the edging tool and with the axis of said guide wheel. The operator can guide the rotating edging tool along the edge of the Formica to be trimmed by placing the guide wheel in contact with the base edge and then inclining the electric motor and edging tool for bringing the rotating tool into contact with the Formica edge for trimming it. The guide wheel will travel over the base edge and will rotate only as the operator moves the motor and rotating edger along the Formica edge. The guide wheel is slightly larger in diameter than the diameter of the rotary cutter and therefore when the guide wheel moves along the base edge, it will space the adjacent portion of the rotating cutter from this edge.

The operator can incline the electric motor and axis of the rotating cutter toward the edge of the Formica sheet for trimming it. By this arrangement the operator can trim the edge down to a point where it will be aligned with the base edge and yet the rotating cutter will not mar the base edge. The ball bearing guide wheel also acts as a steadying support for the cutter and permits the operator to be accurate in the trimming of the Formica edge.

A further object of my invention is to provide a modified form of the tool in which the cutter portion has an integral annular flange at one end that will position the cutter adjacent to the edge of the plastic sheet that is to be trimmed.

Other objects and advantages will appear as the specification continues. The novel features of the invention will be set forth in the appended claims.

*Drawing*

For a better understanding of my invention, reference should be made to the accompanying drawing, forming part of this specification, in which:

FIGURE 4 is an enlargement of the dot-dash circled portion in FIGURE 1.

While I have shown only the preferred forms of my invention, it should be understood that various changes, or modifications, may be made within the scope of the annexed claims without departing from the spirit thereof.

*Detailed Description*

Figure 1:
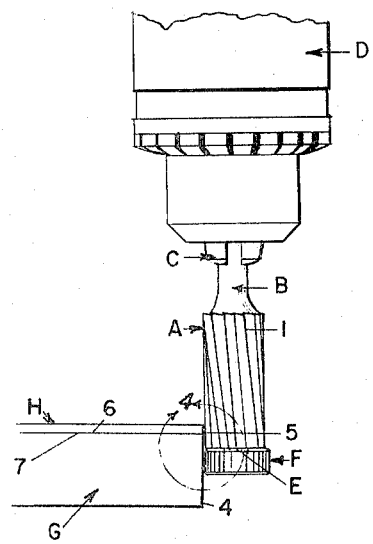
FIGURE 1 is a side elevation of the rotary edging tool with guide wheel, the shank of the tool being received in the chuck of an electric motor and the guide wheel contacting with an edge of a base to which a sheet of Formica or other plastic material has been cemented.

In carrying out my invention, I provide a rotary edging tool which has a cylindrical cutter indicated generally at A and preferably made from file steel. The cutter has helical-shaped cutting teeth 1 that extend from end to end of the cutter. The diameter of the rotary cutter or file may be one-half of an inch although I do not wish to be confined to any exact measurement. The cutter has an integral shank B and the shank is one-fourth of an inch in diameter. FIGURE 1 shows the shank B removably received in a motor chuck C. The motor chuck forms a part of an electric motor indicated generally at D. The motor casing may be provided with a handle, not shown, for permitting the operator to guide the rotary edging tool.

Figure 3:
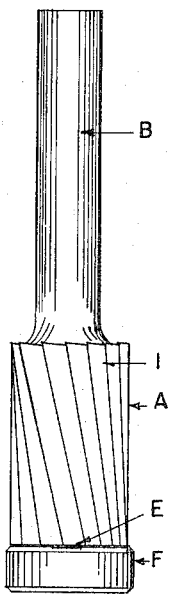
FIGURE 3 is a side elevation of the tool and guide wheel on the same scale as illustrated in FIGURE 2.
Figure 2:
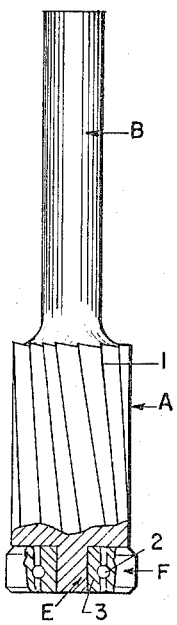
FIGURE 2 is a side elevation of the edging tool and guide wheel on a larger scale, portions of the tool and guide wheel being shown in section.

In FIGURE 2, I show a portion of the rotary edging tool in section. The cylindrical cutter A is partly shown in section in order to illustrate that the shaft E is integral with the cutter. This shaft preferably has a diameter of three-sixteenths of an inch although I do not wish to be confined to this exact measurement. The shank E receives a ball bearing guide wheel F. The outer diameter of this guide wheel is slightly larger than the outer diameter of the cylindrical cutter A. For example, if the diameter of the cylindrical cutter is one-half of an inch, then the outer diameter of the ball bearing guide wheel F would be ten thousandths of an inch larger than the diameter of the cutter. Again I do not wish to be confined to any exact measurement.

In FIGURE 2, I show the shank E in section and I further show the ball bearing guide wheel F partially in section. The guide wheel F has a ball bearing race indicated generally at 2. The inner sleeve 3 of the ball bearing race has a force fit with the shaft E so as to hold the guide wheel in place when it is once mounted on the shaft E.

Figure 4:
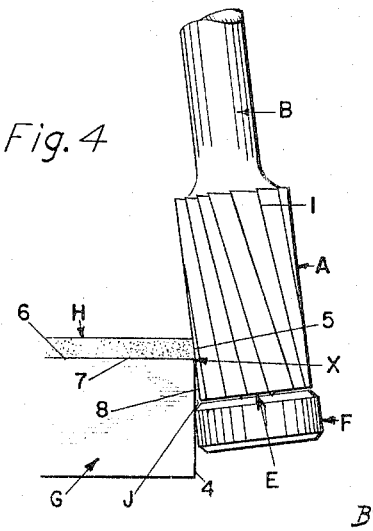
FIGURE 4 shows the guide wheel contacting with the edge of the base and the rotary edging tool inclined slightly so that it will contact only with the edge of the plastic sheet for trimming it.

In FIGURES 1 and 4, I show a base member G having an edge 4. I also show a sheet of Formica H or other plastic material and this sheet has an edge 5 that is to be trimmed down to coincide with the edge 4 of the base G after the sheet is cemented to the base. As already stated, the operator in applying the sheet of Formica to the base first spreads a layer of cement on the surface 6 of the base and spreads another layer of cement on the surface 7 of the Formica sheet H before the sheet is applied to the base. Both layers of cement are permitted to dry and when they feel dry to the touch of the operator, he then places the Formica sheet H down upon the base G for bringing the two layers of cement into contact with each other. Great care must be taken in doing this because as soon as the two layers of cement contact each other, an immediate bonding of the Formica sheet to the base is effected.

Normally the edge 5 of the Formica sheet H projects a slight distance beyond the edge of the base G and it is necessary to trim the edge 5 so that it will align with the edge 4. This trimming is usually done by a file and it requires great effort and skill to file the edge 5 down so that it will coincide with the edge 4 of the base and yet make no file marks on the edge 4.

If a rotary cutter is used for trimming the edge 5, still greater care is necessary to guide the cutter so as to trim only the edge 5 and not mar the edge 4 of the base G. This is almost impossible to accomplish. I have overcome the above difficulties with my invention by mounting the guide wheel F on a shaft E that is integral with the rotary cutter A and has its axis coinciding with the cutter axis. The diameter of the guide wheel F is slightly larger than the diameter of the rotary cutter and this permits the guide wheel to be placed against the edge 4 of the base G as shown in FIGURE 4. The operator then inclines the rotating cutter A in order to contact with the edge 5 for trimming this edge.

It will be seen from FIGURE 4 that a small triangular space J is formed between the portion 8 of the cylindrical cutter A that lies adjacent to the edge 4 of the base G and the adjacent surface of the edge 4 of the base. The cylindrical cutter A is inclined so that at the completion of the trimming operation along the edge 5, the cylindrical portion 8 of the cutter will be tangent to the top of the edge 4 at the point X. The edge 5 of the Formica sheet H will be trimmed to a slight bevel due to the slight inclining of the cutter, but this will not be noticeable.

The operator takes care in not moving the rotary cutter A any closer to the edge 4 of the base G than that indicated by the point X. The triangular space J will always be maintained by the guide wheel F and therefore the rotating cutter A cannot mar the edge 4. The guide wheel F will rotate on the shaft E only as the tool is moved along the edge 4 of base for trimming the edge 5 of the Formica sheet H. The trimming of the edge 5 can be quickly accomplished because the rotary cutter A rotates at a high speed. Great accuracy can be maintained by the operator because the point of contact with the Formica of the base G will constitute a fulcrum for the swinging of the cutter A toward or away from the edge 5.

Although I have mentioned a plastic sheet H, such as Formica, it is possible to trim the edge of a sheet of plywood, not shown.

Figure 5:
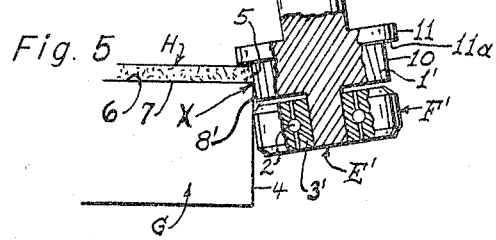
FIGURE 5 is a modified form of the edging tool.

In FIGURE 5, I show a slightly modified form of the tool. In this form the cutting teeth 10 are not as long as shown in FIGURES 1 and 4. The tool is shown twice normal size and the length of the cutter portion is one-eighth of an inch long although I do not wish to be confined to any particular measurement. The tool has an integral annular flange 11 that has a diameter about one-eighth of an inch larger than the diameter of the cylindrical cutter portion that has the helical teeth thereon.

All other parts of the tool shown in FIGURE 5 are the same as that shown in FIGURES 1 to 4 inclusive and therefore like parts will be given the same letters or reference numerals except that they will be primed. The edging tool shown in FIGURE 5 is inclined at the same angle to the Formica sheet H and base member G as the tool shown in FIGURE 4. The annular flange 11 will have the side 11a that is disposed adjacent to the cutting teeth 10, contacting with the upper surface of the plastic sheet H. The ball bearing guide wheel F' will contact with the edge 4 of the base member G, and this will incline the cutter portion 10 so that it will contact with the edge 5 of the Formica sheet at the point X which is the lower corner of the edge 5.

A small triangularly-shaped space will separate the cutter teeth 10 from the edge 5 of the plastic sheet H and the rotating tool will therefore not mar the edge 4 of the base member G. The cylindrical portion 8' of the cutter will be tangent to the top of the edge 4 at the point X. The edge 5 of the plastic sheet H will be trimmed to a slight bevel. The guide wheel F' will only rotate as the tool is moved along the edge 4 of the base member G. The cylindrical portion carrying the helical teeth 10 is not tapered or made cone-shaped.

The annular integral flange 11 could be changed to a separate washer or disc that has a ball-bearing mounting, not shown, between it and the shank B'. This would do away with the washer rotating at the same speed as the cylindrical cutter 10. The washer would only rotate at a speed caused by the movement of the tool along the edge of the Formica sheet H.

The flange 11 normally prevents the tool from being moved downwardly in the direction of its axis so that the cylindical cutter 10 would gouge into the side 4 of the base member G. Should the tool for any reason slip while being used and cause the flange 11 to move over the edge 5 of the Formica sheet H, this very movement would bring the periphery of the flange into contact with either the edge 5 of the sheet H, or the edge 4 of the base G. The flange 11 in either case will space the cylindrical cutter from the edges 5 and 4 and prevent any damage being done.

I claim:

1. A rotary tool for edge dressing a piece of work mounted on a supporting base wherein the edge of said piece of work projects a slight distance beyond the edge of said supporting base comprising:
   (a) a cylindrical cutter having a shank at one end adapted to be removably gripped by a rotatable chuck;
   (b) said cutter having an integral shaft at its other end whose outer diameter is less than that of the cutter and whose axis coincides with the cutter and shank axis; and
   (c) a ball bearing guide wheel mounted on said shaft for rotative movement independent of said cutter, the diameter of said wheel being slightly larger than that of the cutter so that the outer periphery of said guide wheel can rotatably ride on the edge of said supporting base independently of any movement of said cutter, said wheel supporting said cutter in spaced relation to the edge of said work and acting as a fulcrum to permit the cutter to be inclined towards and engage the edge of said piece of work.

2. A tool of the type as set forth in claim 1 wherein said cutter has an annular flange provided at its upper end which is adapted to overlie and engage the upper surface of said piece of work.

References Cited by the Examiner

UNITED STATES PATENTS

| 2,599,712 | 6/1952 | Izen | 144—144 |
| 2,672,898 | 3/1954 | Schuster. | |
| 2,872,731 | 2/1959 | Greenwood. | |

FOREIGN PATENTS

| 956,807 | 1/1957 | Germany. |

WILLIAM FELDMAN, *Primary Examiner.*

JAMES L. JONES, JR., *Examiner.*